Fig. 2

Patented June 21, 1932

1,864,186

UNITED STATES PATENT OFFICE

EDMA H. CURTIS, JR., OF CINCINNATI, OHIO, ASSIGNOR, BY MESNE ASSIGNMENTS, TO GENERAL GLASS CORPORATION, OF LANCASTER, OHIO, A CORPORATION OF OHIO

APPARATUS FOR FEEDING MOLTEN GLASS

Application filed February 8, 1928. Serial No. 252,882.

This invention relates to mechanism for obtaining individual mold charges of molten glass from a melting pot, tank or other source of supply of molten glass. A mechanism of this nature is referred to in the art as a feeder. These feeders are usually placed at the outer ends of troughs or spouts extending radially from a large tank or melting furnace. Below each feeder is disposed a forming machine which receives the mold charges dropped by the feeder and fabricates said charges into articles of glassware such as bottle, jars, etc.

This invention particularly relates to the type of feeder commonly known as the plunger feeder which is in general use at present. A feeder of this type comprises a container for the molten glass, provided with an aperture in the bottom thereof, and a plunger reciprocable over said aperture to lower the glass intermittently below a severing plane at which the charges are sheared from the issued glass.

The object of this invention is to provide a plunger feeder wherein the path over which the plunger travels can be varied or adjusted in three planes perpendicular to one another without altering the direction or extent of the plunger stroke.

Another object of the invention is to provide a plunger feeder wherein the plunger is cam lifted and the characteristics of the plunger stroke are adjustable while the machine is in operation.

Another object of the invention is to provide a compact plunger operating mechanism for a feeder of the class described, the adjustments for said mechanism being conveniently grouped and accessibly disposed.

Another object of the invention is to provide a cam for operating the plunger of a glass feeding mechanism of the class disclosed, said cam contoured and mounted to provide a plurality of different plunger strokes.

Another object of the invention is to provide a cam for operating the plunger of a glass feeding mechanism of the class disclosed, said cam constructed to be readily interchangeable with other cams, without dismembering the machine.

Other objects and certain advantages will be more fully set forth in a description of the accompanying drawings, forming a part of this specification, in which.

In brief, the feeder comprises a container for the molten glass connected with a source of supply of molten glass. In the bottom of the container is an aperture which is submerged under molten glass during the operation of the feeder. Below the container a pair of shears is mounted so that the blades may cut charges from the glass which issues through the flow ring. Normally the shears are held open but are automatically closed by mechanism synchronized with the operations of the forming machine.

On one side of the container is a support upon which is mounted a platform adjustable horizontally thereon. These adjustments are made by handwheels carried by the platform, one of which adjusts it to and from the container and the other of which adjusts it transversely to the first plane of adjustment. Upon this platform is mounted a motor which drives a vertically extending shaft. A column or standard rises vertically from the table and has slidably mounted thereon a rail or support which carries a stud on which is pivoted a lever, preferably a bell crank lever, one arm of which extends over the container. A plunger depends from the end of this arm of the bell crank lever through an aperture in the roof of the container and is disposed substantially in axial alignment with the aperture in the bottom of the container. The other arm of the bell crank lever extends downwardly, outwardly from the container and is provided terminally with a cam roller which makes contact with an elongated cam splined upon the vertical shaft. The rotation of this cam therefore raises and lowers the plunger within the container.

Two vertical adjustments are provided. One handwheel raises and lowers the support which carries the pivot point of the plunger actuating lever and also the cam at the same time so that the elevation at which the plunger is operated is changed. A second handwheel raises and lowers the cam in relation to the cam roller. The cam is provided with contouring which varies axially so that said relative adjustment of the cam and roller elevations changes the characteristics of the plunger stroke.

The vertical drive shaft is provided with a trip which is adapted to open two valves, first a valve which causes the shears to operate and second a valve which causes the forming machine to commence the fabrication of the article. These valves are circumferentially adjustable in relation to the shaft so that the time of shear and forming machine operation and the plunger operation can be advanced or retarded without changing speed of mechanism or frequency of operations to compensate for change in viscosity of glass or permit the feeding of variously formed and sized charges suitable for different articles of glassware.

Figures 1, 4, 5, 6:
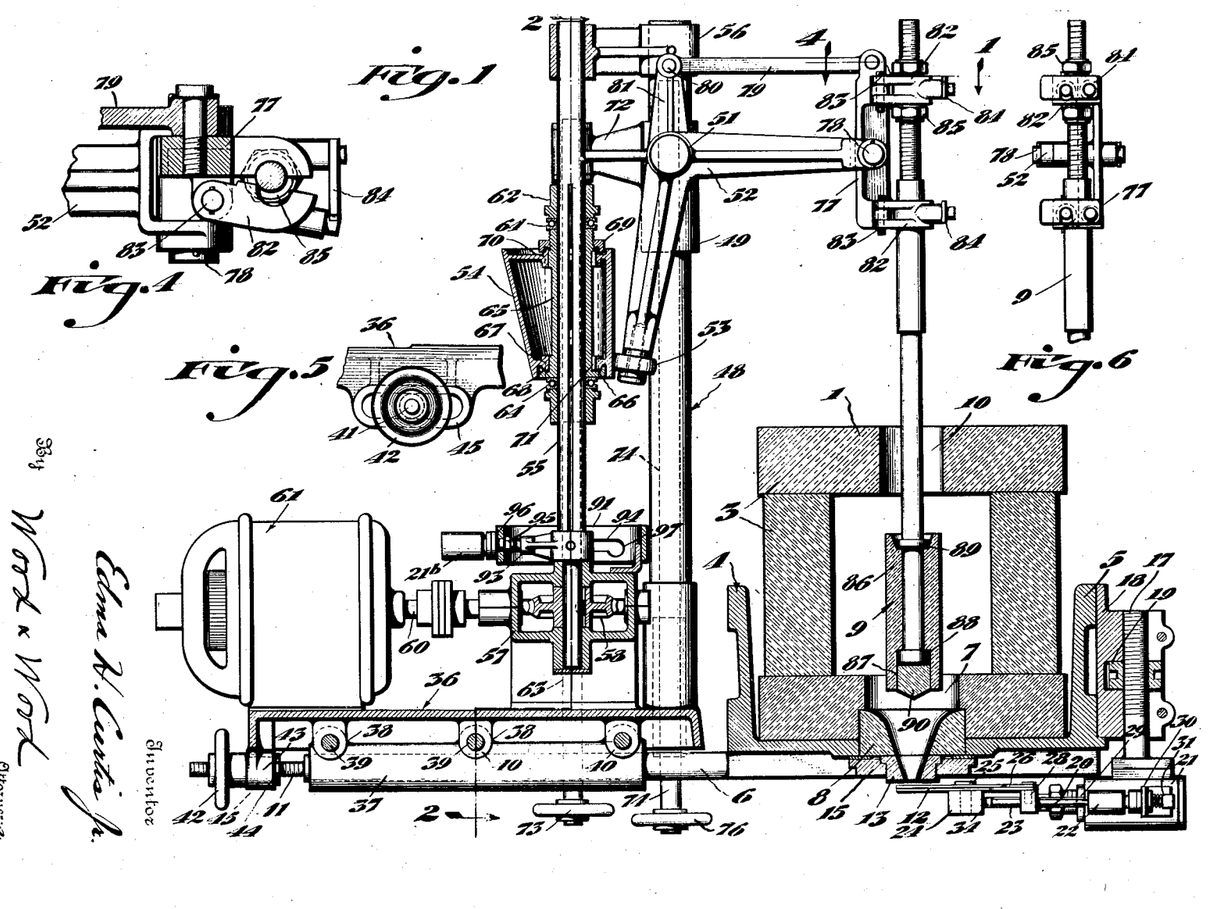
Figure 1 is a vertical sectional view taken longitudinally of the feeder and showing the general layout of the mechanism.
Figure 4 is a detail sectional view taken on line 4—4, Figure 1, illustrating the manner in which the plunger is detachably hung from the plunger operating mechanism.
Figure 5 is a fragmentary end view of a portion of the plunger operating mechanism platform showing the manner in which the platform adjustment handwheel is mounted therein for permitting adjustment of the platform transverse thereto.
Figure 6 is a face view of the double bearing element supporting the plunger.

Referring to the drawings, a container for the molten glass is indicated at 1 and is in the nature of a snout extending from the side of a main supply tank 2 of molten glass. The container is formed of clay blocks 3 which are mounted in the form of a rectangle upon a metal base 4 which is supported upon or attached to the side of the main supply tank 2. The base 4 is provided with sides 5 and has rods 6 extending out from one side thereof as a mounting for the glass feeding mechanism. The outer end of the container 1 has its bottom apertured as at 7 and a well 8 having a conical bore is secured therein. A plunger 9 depends downward through an aperture 10 in the top of the container and is axially aligned with the outlet in the bottom of the container. The well 8 is constructed of clay container and has mounted below it a flow ring 13 provided with a conical bore which forms an extension of the conical bore of the well. The flow ring is secured against the well by means of a ring 15. This flow ring is removable or interchangeable with flow rings of different bore in order to vary the size of the feed orifice to suit the ware to be fabricated. Reciprocation of this plunger feeds the glass through the flow ring, and a pair of shears 12 is provided below the flow ring for the purpose of cutting off the molten glass fed through the flow ring by the movement of the plunger. The shears 12 are operated by means of an air operated motor, the opening and closing thereof being synchronized with the reciprocation of the plunger and the operation of the forming machine. The pair of shears 12 and its operating mechanism are adjustably secured to the base 4 by means of a stud 17 extending upwardly from the cylinder of the motor through a bracket 18 secured to the side of the base. This stud is screw-threaded and a nut 19, rotatably secured in the bracket, engages the threads of the screw for adjusting the stud and the shear mechanism vertically in relation to the feed orifice.

The air operated piston 20 which opens and closes the shears is moved back and forth in a cylinder 21 and is controlled as to direction by means of a valve 22 secured to the side of the cylinder 21. A pair of rods 23 extends out horizontally from the front end of the cylinder toward the feed orifice. These rods 23 carry a block 24, the block supporting the shear blades 12. The shear blades are pivoted centrally of the block 24 on a pivot pin 25 and extend directly beneath the feed orifice. A pair of links 26 connect the respective rear ends of the shear blades to a common pivot pin extending upwardly from the center of a slide block 28 mounted on the rods 23, this block being secured to the forward end of the piston. A rod 29 is slidably mounted in a bracket 30 attached to the side of the cylinder, this rod traversing the outer end of slide block 28 and being supported therein. The end of the rod 29 passing through the support bracket 30 is provided with a contact block 31, this block 31 extending laterally and horizontally, and having a contact 32 disposed adjacent to and axially aligned with the outer end of a valve plunger 33 operating within the valve 22 secured parallel to the rod 29 and on the bracket 30. The other end of the rod 29 or the end toward the shears is headed as at 34.

Figure 3:
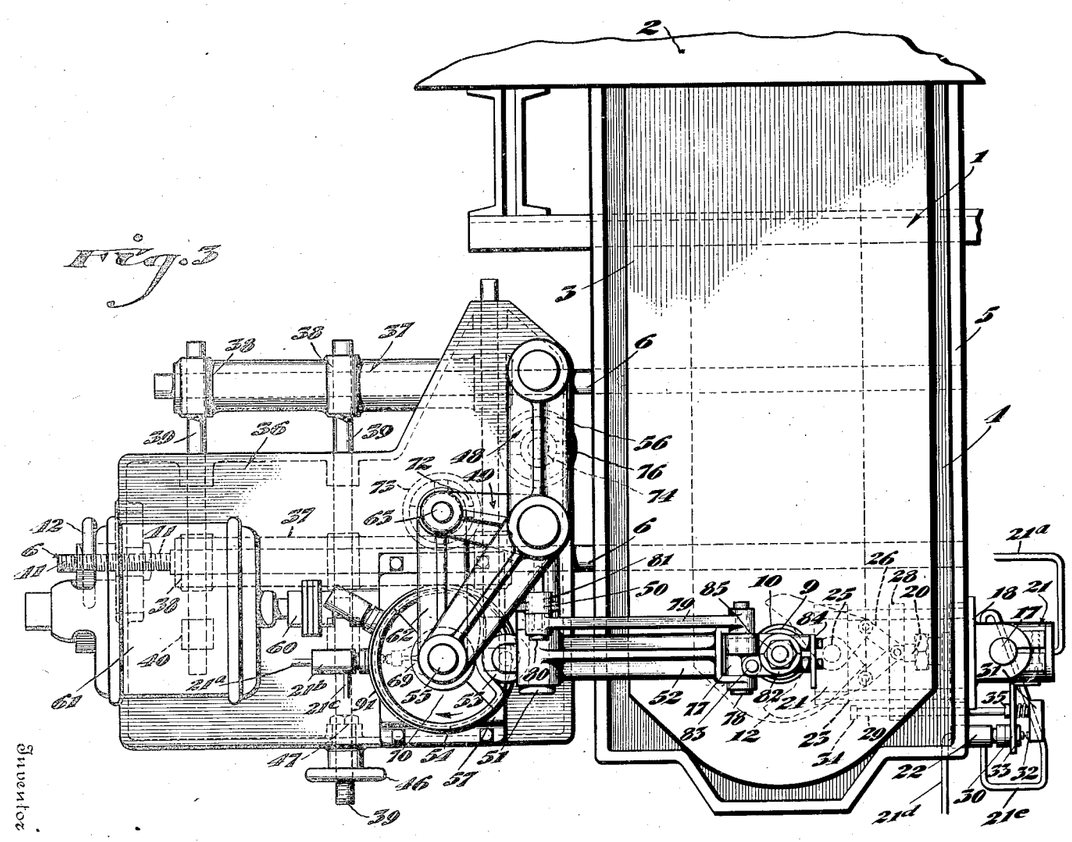
Figure 3 is a top plan view of the feeder.

An air supply line 21ᵃ connects to the rear of the cylinder 21, this line extending from a control valve 21ᵇ disposed for operation from the main drive shaft of the machine, air being supplied to the valve 21ᵇ from a main air line 21ᶜ. The various air supply connections are shown diagrammatically in the Figure 3 only, inasmuch as they would tend to unnecessarily confuse the other views.

As the piston moves forward in a shear closing operation, due to admission of air through line 21ᵃ, the block 28 slides forward on the rods 23 and the outer end of the block engages the headed end of the rod 29, drawing the rod forward and causing the contact 32 to move the valve plunger. This valve plunger operates the valve 22 and permits air to pass through the valve from a main supply line 21ᵈ through line 21ᵉ connected to the forward end of the cylinder, moving the piston backwardly and opening the shears. Upon the return movement of the piston the rod 29 is restored to normal position for closing the valve 22 by means of a spring under compression between the block 31 and the bracket 30, a stop 35 being formed on rod 29 for limiting this backward movement of the rod 29 by its engagement with the bracket 30. The internal construction of the shear operating air motor and the valve for controlling the direction of movement of the piston are not disclosed herein, since these elements are in general use in the glass machinery art.

A plunger operating mechanism is mounted on a platform 36, this platform 36 being adjustably mounted on the previously described rods 6 for translation in all four horizontal directions. This adjustable mounting of the platform is accomplished in the following manner. A pair of sleeves 37 are loosely and slidably mounted on the respective rods 6. These sleeves 37 have upwardly extending bosses 38, with bores extending therethrough at right angles to the bore of the sleeve below. Rods 39 extend through the bosses 38 and through bosses 40 projecting from the under side of the platform. The rods 39 are pinned to the bosses 38 of the sleeves 37 and are loosely and slidably mounted in the bosses 40 of the platform. One of the rods 6 has a threaded stud 41 extending from its outer end. This stud carries a handwheel 42 traversing and having bearing in a horizontal slot formed in a downwardly extending oblong lug 43, the slot being of the same width as the bearing portion of the hub of the hand wheel 42.

Figure 2:
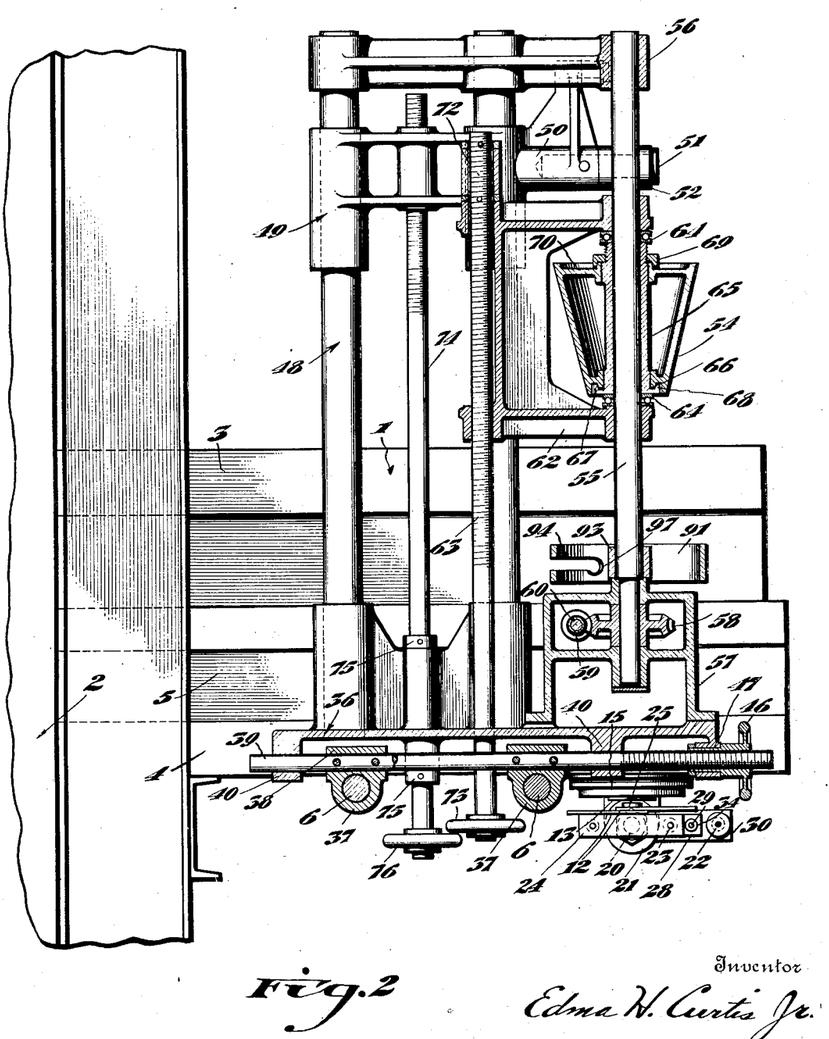
Figure 2 is a sectional view taken on line 2—2, Figure 1.

The handwheel 42 rotatively secured within the lug or bearing (see detail of handwheel in Figure 2) is held against longitudinal movement relative to said lug by means of a nut 44 screwed on the extension 45 of the handwheel hub, this nut 44 engaging one side of the lug 43, the shoulder formed by the extension on the handwheel hub engaging the other side of the lug. Rotation of the handwheel 42 on the screw-threaded stud 41 due to the fact that the stud 41 is secured to the stationary base 4 moves the platform toward and from the container, sliding it on the rods 6 through the bearings of the sleeves 37.

Adjustment of the platform at right angles to the previously described plane of adjustment is accomplished by means of a second handwheel 46, mounted in a circular bearing or lug 47 which depends from the platform. The handwheel 46 is engaged on the threaded end of one of the rods 39. This handwheel is of the same construction as the handwheel 42 but is not movable laterally in its bearing this being unnecessary here since the platform and the rod 39 move as a unit in the other plane of adjustment. Inasmuch as the rods 39 are pinned to the sleeves 37, which are immovable laterally in relation to the rods 6, rotation of the handwheel on the threaded end of the rod moves the platform in relation to the sleeves 37 and therefore transversely in respect to the container 1. Inasmuch as the entire plunger mechanism is mounted on the platform 36, it is apparent that these adjustments at right angles to each other provide that the plunger hung within the container may be adjusted for axial alignment or disalignment with respect to the flow ring.

The plunger reciprocating mechanism is adjustably mounted on a standard 48, comprising two posts and a cross member extending upwardly from the platform 36. The plunger operating lever support 49 is in the nature of a rail which is provided with two bearings, one slidably disposed on each post. A boss 50 extends laterally from one of the bearings of the sliding support and radially of one post. A stud 51 is provided at the outer end of the boss and a bell crank lever 52 is pivoted on this stud. One end of the bell crank lever is attached to the plunger and the other end carries a roller 53 which is engaged by a cam 54 secured on a vertically mounted drive shaft 55. The drive shaft 55 is rotatably journaled in the cross member or bearing bracket 56 pinned to the top of the standard 48. The lower end of the vertically disposed drive shaft 55 is mounted in a gear box 57 secured to the upper face of the platform. A worm wheel 58 is secured to the lower end of the drive shaft 55 within the gear box and is driven by a worm gear 59 secured to the main drive shaft 60 of a variable speed motor 61, mounted on the platform.

The cam 54 has a splined connection to the drive shaft 55 in order that it may be vertically adjusted thereon and is mounted between the arms of an adjustable bracket 62 which has a screw-threaded connection with a verticaly disposed adjustment rod 63. The arms of the adjustable bracket are slidably traversed by the drive shaft and serve merely as the support for the cam mounted therebetween.

Above and below the lower and upper arms, respectively, of the bracket 62 are disposed roller bearings 64. Between the roller bearings and splined to the drive shaft is a sleeve 65 provided at its bottom with a flange in which is a circumferential groove 66. The cam comprises two pieces which mate in a vertical plane to form a hollow cam. Each portion is provided internally and near its bottom with a circumferential flange 67, which fits against the sleeve 65 and has a shoulder portion 68 which seats in the circumferential groove 66. The upper end of the sleeve 65 is threaded, and a retaining collar 69 screwed thereover engages the rim of a second circumferential flange 70 extending inwardly from the cam portions near their tops, holds said flanges against the sleeve, and prevents the axial displacement of the cam parts. Rotative connection between the cam and sleeve is maintained by means of keys 71 engaged in respective keyways formed in these parts at the top and bottom of the cam.

This construction makes it possible to interchange cams easily by simply raising the collar 69, lifting out the cam halves replacing them with others, and screwing down the collar.

The adjustment rod 63 is hung and loosely mounted from an arm 72 integral with the plunger support 49 and extending radially from one bearing thereof. This rod is screw-threaded through the adjustable bracket 62 and is rotated by means of a handwheel 73 secured at the lower end thereof, below the platform, through which it loosely extends. The adjustment rod 63 provides the adjustment of the cam in relation to its roller for varying the length or other characteristics of the stroke of the plunger.

As disclosed, this cam has the general shape of an eccentric truncated cone. The preferred form is contoured to provide that the lower position of the plunger be the same for the range of the cam but that the stroke be variable in length. A cam of this type can be interchanged with other cams to provide change in the lowermost position of the plunger, change in the speed of the plunger rise or drop, change in time of the plunger operation or a plurality of these changes in combination. In other words, this cam is equivalent to a plurality of different cams capable of selective employment.

In order to vary the general position of the plunger in relation to the flow ring without varying the length of the stroke another vertical adjustment is provided. A vertically disposed rod 74 extends through the platform and is held against longitudinal movement by means of collars 75 pinned thereto and engaging the upper and lower sides of the platform. The upper end of the rod 74 is screw-threaded into a nut portion of the plunger support, which is situated intermediate its bearings which slide upon the standards. On the lower end of the rod 74 is a handwheel 76, the rotation of which slides the plunger support on the standard 48 up or down as desired. Inasmuch as the plunger support carries the cam and the bell crank lever, there is accomplished no change of the relative positions of the cam and roller through this adjustment.

The plunger supporting end of the bell crank lever 52 carries a double bearing element 77 which is pivotally attached thereto as at 78 intermediate said bearings. In order to stabilize the movement of the plunger as the bell crank lever is swung, a link 79 is pivotally attached to the upper end of the double bearing element and to a stud 80 extending laterally from a lug 81 integral with the plunger support 49, and extending upwardly from the boss 50. It will be seen from this construction that when the bell crank lever is swung there is a slight disalignment of the plunger in relation to the orifice, but the link prevents any undesirable swinging of the plunger.

The bearing points of the double bearing element 77 are split and a half 82 of each is pivoted as at 83 to the body of the double bearing element and is adapted to be clamped to its companion bearing half by means of a latch 84, which is pivoted to the stationary half and hooks over a pin extension on the swinging half. The plunger 9 has its upper end screw-threaded for receiving a pair of nuts 85, adapted to engage the respective sides of the upper bearing, the plunger rod being loosely mounted in both bearings. To adjust the plunger in relation to its bearing the nuts are loosened and the plunger moved up or down to its desired location and the nuts then tightened to the sides of the upper bearing. The respective bearings are split so that it is possible to quickly interchange the plungers. The lower end of the plunger or the end within the container carries a clay head 86. The head 86 is bored throughout its length and is counterbored at its lower end as at 87. The head is secured on the rod between an abutment 88 on the lower end of the rod and an abutment 89 or shoulder formed on the rod adjacent to the top of the head. A plug 90 fills up the counterbored portion to protect the lower end of the rod and to provide a solid clay lower end for ejectment of the molten glass.

The movements of the plunger and the operation of the shears as well as the movements of the forming machine are all synchronized. This is preferably accomplished as shown in these drawings. A ring 91 is secured concentrically about the drive shaft 55 and a series of valves 21$^b$ adjustably disposed on the ring. A valve operating lever or trip 93 is secured to the drive shaft for operating the various valves in a regular cycle. These valves are connected by air lines (not shown) to the shears and the forming machine.

The valves are secured in a slot 94 in the ring or segment by nuts 95 on the valves which clamp the segment between themselves and shoulders 96 on the valves. The valves are placed in the slot by inserting them through an enlarged aperture 97 at one end of the slot.

In operation, the glass is permitted to flow through the outlet by gravity which is supplemented by the downward stroke of the plunger. The shears are then operated to sever a charge of molten glass which drops to the forming machine. At about this time the plunger rises elevating and reheating the stub. The cycle is then repeated.

The temperature of the glass, the speed of the motor, the elevation of the plunger stroke, the characteristics of the plunger stroke, the timing of the plunger stroke and the action of the shears all affect the mass and weight of the mold charges. The construction above described permits a great latitude of plunger adjustments which enables the skilled operator to make a wide range of ware from one feeder.

The horizontal adjustments enable the operator to centralize the plunger or if desirable to feed glass from whichever side of the flow ring at which the glass is in best condition.

All of the adjustments are readily accessible and easily accomplished so that a feeder such as disclosed can be kept in very steady and efficient commercial operation.

Having described my invention, I claim:

1. A mechanism for separating molten glass into mold charges, comprising, a container for the glass having an aperture in the bottom thereof, severing means mounted below said aperture for detaching charges of the issued glass, a support at one side of said container, a table mounted upon said support, and adjustable thereon horizontally, a motor mounted upon said table, a vertically extending shaft adapted to be rotated by said motor, a cam disposed upon said rotating shaft, a standard extending upwardly from said table, a lever, the pivot point of which is vertically adjustable on said standard, and a plunger disposed upon one end of the lever over the aperture in the bottom of the container, the other end of said lever being in contact with said cam, whereby the rotation of the cam reciprocates the plunger.

2. A mechanism for separating molten glass into mold charges, comprising, a container for the glass having an aperture in the bottom thereof, severing means mounted below said aperture for detaching charges of the issued glass, a support at one side of said container, a platform mounted upon said support and adjustable thereon to and from the container and at right angles thereto, a motor mounted upon said table, a vertically extending shaft adapted to be rotated by said motor, a cam vertically adjustable upon said rotating shaft, a post extending upwardly from said table, a lever pivoted to said post with the pivot point vertically adjustable in relation to the table, and a plunger disposed upon one end of the lever over the aperture in the bottom of the container, the other end of said lever being in contact with said cam, whereby the rotation of the cam reciprocates the plunger.

3. A mechanism for separating molten glass into mold charges, comprising, a container for the glass having an aperture in the bottom thereof, a severing means mounted below said aperture for detaching charges of the issued glass, a support at one side of said container, a table mounted upon said support and adjustable thereon horizontally, a motor mounted upon said table, a vertically extending shaft adapted to be rotated by said motor, a post extending upwardly from said table, a bell crank lever pivoted to said post, a plunger disposed upon one end of the lever over the aperture in the bottom of the container, a cam keyed to said shaft, said cam in contact with the other end of said lever, whereby the rotation of the cam reciprocates the plunger, means for adjusting vertically the pivot point and cam together, and means for adjusting them vertically relatively.

4. An apparatus for feeding charges of molten glass, comprising, a container for the glass having an aperture in the bottom thereof, a plunger mounted for reciprocattion over said aperture, a cam adapted to reciprocate said plunger, a pair of shears mounted below said aperture, said shears adapted to sever charges from the issued glass, an air cylinder adapted to operate said shears and means for changing the time of operation of the shears in relation to the time of operation of the plunger without changing the frequency of operation.

5. An apparatus for feeding charges of molten glass, comprising, a container for the glass having an aperture in the bottom thereof, a plunger mounted for reciprocation over said aperture, a cam adapted to reciprocate said plunger, a pair of shears mounted below said aperture, said shears adapted to sever charges from the issued glass, an air motor adapted to operate said shears, a trip upon the shaft carrying said cam, a segment disposed substantially in the plane of revolution of said trip and a valve adapted to operate the air cylinder controlling the shears, said valve adjustably mounted upon said segment.

6. An apparatus for feeding charges of molten glass, comprising, a container for the glass having an aperture in the bottom thereof, a plunger mounted for reciprocation over said aperture, a cam axially varying diameter adapted to reciprocate said plunger to varying degrees, a pair of shears mounted below said aperture, said shears adapted to sever charges from the issued glass, an air motor adapted to operate said shears and means for changing the time of operation of the shears in relation to the time of operation of the plunger without changing the frequency of operation.

7. An apparatus for feeding charges of molten glass, comprising, a container for the glass having an aperture in the bottom thereof, a plunger mounted for reciprocation over said aperture, a cam adapted to reciprocate said plunger, a pair of shears mounted below said aperture, said shears adapted to sever charges from the issued glass, an air motor adapted to operate said shears and means for changing the time of operation of the shears in relation to the time of operation of the plunger without changing the speed of the mechanism, said means comprising a trip on the cam shaft and a shear actuating valve adapted to be tripped thereby, said valve adjustable circumferentially about said shaft.

8. In a glass feeder, a container, a reciprocating plunger and reciprocating shears, variable plunger operating mechanism comprising, a longitudinally elongated differentially contoured cam and translating mechanism, means for rotating the cam, pneumatic means for reciprocating the shears, and a control member for said pneumatic means arranged for actuation by the cam rotating means.

9. In a glass feeder, a container, a reciprocating plunger and reciprocating shears, variable plunger operating mechanism comprising, a longitudinally elongated differentially contoured cam and translating mechanism, means for rotating the cam, pneumatic means for reciprocating the shears, a control member for said pneumatic means adjustably arranged for actuation by the cam rotating means, and a support adjustable in relation to the container and adjustably supporting the plunger and its reciprocating mechanism.

10. In combination with the container of a glass feeder, a reciprocating plunger, a longitudinally extended differentially contoured cam having its axis disposed parallel to the line of plunger movement, translating mechanism between the cam and plunger, means for relatively adjusting the cam and translating mechanism, cam rotating means, a support for the plunger mechanism adjustable in relation to the container, and means for adjusting the plunger and translating mechanism relative to the support and to the container.

11. Mechanism for feeding charges of molten glass, comprising, a container for the molten glass, an aperture in the bottom of the container, a plunger mounted over said aperture, a support mounted adjacent to said container, a cam, a lever pivotally attached to said support, one end of said lever bearing against said cam, an element having a double bearing attachment to said plunger, said element pivotally attached to the other end of said lever intermediate of the bearings of said element, a stabilizing link connecting the upper end of the bearing element and the support, and the bearings of the elements sectional and having hinged connections for spreading the sections in plunger removal operations, and means for securing the sections together.

12. Mechanism for feeding charges of molten glass, comprising, a container for the molten glass, an aperture in the bottom of the container, a plunger mounted over said aperture, a support mounted adjacent to said container, a cam, a lever fulcrumed on said support, one end of said lever actuated by said cam, a plunger supporting yoke pivotally secured intermediate its arms on the other end of said lever, the arms of said yoke constituting vertically disposed plunger bearings, each bearing comprising sections hinged together for permitting plunger removal laterally therefrom, latches securing the sections together, and means for adjustably securing said plunger longitudinally of the bearings.

13. In combination with a container for molten glass having an aperture in its bottom and shearing mechanism mounted below said aperture to detach depending charges of molten glass, gob feeding mechanism, comprising, a plunger disposed within said container and mounted to be reciprocated substantially in axial alignment with the aperture in the bottom, an elongated and differentially contoured cam adapted to reciprocate said plunger and to impart to it different strokes of different characteristics, mechanism adjustable during the operation of the machine for translating the cam to utilize the different portions of its surface, and a motor adapted to rotate the cam.

14. A glass feeder comprising a container formed with a discharge orifice, a plunger arranged for reciprocation in the container, a vertical power shaft and a vertical and parallel upright support, a plunger mounting member adjustable on said support, an elongated differentially contoured cam splined on the power shaft and a bell crank lever operatively connecting said cam and plunger, said bell crank lever and cam being relatively adjustable in relation to each other to vary the characteristics of the plunger stroke, said cam and plunger mounting being adjustable as a unit in relation to the container.

15. In combination with a container for molten glass having an aperture in the bottom thereof, shearing mechanism located below said aperture, gob feeding means, comprising, a plunger adjustably disposed in said container in relation to the discharge orifice thereof, an elongated and differentially contoured cam, mechanism operatively connecting said plunger and said cam, means rendering the said cam and said mechanism relatively adjustable to vary the stroke of the plunger, the portion of the cam defining the lowermost position of the plunger, for all of said different length strokes, being defined by a straight line parallel to the axis of the cam, and means for rotating said cam.

16. In a glass feeder, a container having a discharge orifice, a reciprocating plunger therein and reciprocating shears under the discharge orifice, plunger operating mechanism comprising, a longitudinally elongated differentially contoured cam, translating mechanism, said cam and translating mechanism being relatively adjustable while the cam is in rotation, means for rotating the cam, means for reciprocating the shears, mechanism actuated by the cam rotating means for synchronizing the shear operating and the plunger operating mechanisms, and a support for the plunger and its reciprocating mechanism adjustable as a unit in relation to the container.

17. In a glass feeder, a container having a discharge orifice, a reciprocating plunger adjustable in relation to the container, shearing mechanism adjustable in relation to the container, plunger operating mechanism comprising a longitudinally elongated differentially contoured cam, translating mechanism therefor, means rendering said cam and translating mechanism relatively adjustable while the cam is in motion, a shaft for rotating the cam, a trip on the cam shaft, a member actuated by said trip for synchronizing the shear action, and a connection between said member and said shears, permitting operation of the shears in their various positions of adjustment.

18. In a glass feeder comprising a container formed with a discharge orifice, a plunger mounted for reciprocal motion above the orifice, means for controlling the length of the plunger stroke while it is in motion to vary the characteristics of the charge extruded through said orifice during the feeding of charges, comprising, an elongated differentially contoured cam and a translating mechanism operatively connecting, the cam and plunger and relatively adjustable, and means adapted to rotate said cam while the plunger stroke is being adjusted.

19. A glass feeder comprising a container having a discharge orifice, a plunger reciprocally mounted therein, in alignment with the aperture, an elongated differentially contoured cam, translating mechanism connecting the cam and plunger, means rendering said cam and translating mechanism relatively adjustable during operation to vary the stroke of the plunger, means for rotating the cam, and means for adjusting the plunger and its operating mechanism vertically in relation to the discharge orifice while the feeder is in operation.

20. In a glass feeder, a container having a discharge orifice, a reciprocating plunger in the container, means for aligning and adjusting the plunger with the aperture comprising a platform adjustably disposed at one side of the container, a plunger mounting and plunger operating mechanism vertically adjustable as a unit on said platform, and adjustment control members on the platform, two rendering the platform horizontally adjustable in transverse directions in relation to the container, and one rendering the plunger mounting and its operating mechanism vertically adjustable in relation to the container, while the feeder is in operation.

21. In a glass feeder, a container having a discharge orifice, a plunger reciprocal therein in alignment with the discharge orifice, a platform disposed at one side of said container, means mounted on the platform enabling the platform to be adjusted in transverse directions in a horizontal plane, a mounting for the plunger and its operating mechanism adjustable vertically on the platform, plunger operating and plunger stroke adjusting mechanism carried by said mounting comprising an elongated differentially contoured cam and translating mechanism relatively adjustable while the cam is in rotation, means for rotating the cam, control members on the platform for adjusting the platform horizontally to align the plunger in relation to the container, a control member on the platform for vertically adjusting the plunger assembly in relation to the container, and a control member on the platform for adjusting the stroke length of the plunger, all of said adjustment mechanisms being operative during continued feeding of charges.

22. In a glass feeder, a container having a discharge orifice, a plunger reciprocal therein in alignment with the discharge orifice, a platform disposed at one side of said container, means mounted on the platform enabling the platform to be adjusted in transverse directions in a horizontal plane, a mounting for the plunger and its operating mechanism adjustable vertically on the platform, plunger operating and plunger stroke adjusting mechanism carried by said mounting comprising an elongated differentially contoured cam and translating mechanism relatively adjustable while the cam is in rotation, means for rotating the cam, control members on the platform for horizontally adjusting the platform in relation to the container, a control member on the platform for vertically adjusting the plunger system in relation to the container, a control member on the platform for adjusting the stroke length of the plunger, all of said adjustment mechanisms being operative during continued feeding of charges, shears and shear operating mechanism, shear-height adjusting mechanism, and means for synchronizing the plunger and the shear operating mechanisms irrespective of the various adjustments specified.

23. In a glass feeder, a container, a reciprocating plunger, shears, variable plunger operating mechanism, comprising a longitudinally elongated differentially contoured cam for reciprocating the plunger, translating mechanism for utilizing different sections of the cam, means for rotating the cam, pneumatic means for operating the shears, and a trip on the cam shaft adapted to operate said pneumatic means.

24. An apparatus for feeding charges of molten glass, comprising, a container for the glass having an aperture in the bottom thereof, a plunger mounted for reciprocation over said aperture, a cam varying in diameter longitudinally adapted to reciprocate said plunger to varying degrees depending upon the cam section utilized, means for selecting the cam section utilized, a pair of shears mounted below said aperture, said shears adapted to sever charges from the issued glass, means for operating said shears, and a trip on the cam shaft adapted to start the operation of said last mentioned means.

25. In a glass feeder of the type wherein a reciprocating plunger operates over a submerged orifice in a container for molten glass thereby discharging a succession of measured mold charges shaped in suspension, mechanism for varying the quota of the charge of glass expelled by the plunger action, said mechanism comprising, an elongated cam for reciprocating the plunger, the curvature of said cam varying longitudinally so that utilization of different cam sections produces different expulsive effects upon the charges being fed, a member adapted to be operated by said cam, means connecting said member to the plunger of the feeder, and means for adjusting said cam and member relatively to select the cam section desired.

26. In a glass feeder of the type wherein a reciprocating plunger operates over a submerged orifice in a container for molten glass thereby discharging a succession of measured mold charge shaped in suspension, mechanism for varying the quota of the charge of glass expelled by the plunger action, said mechanism comprising, an elongated cam for reciprocating the plunger, the curvature of said cam varying longitudinally so that utilization of different cam sections produces different expulsive effects upon the charges being fed, a member adapted to be operated by said cam, means connecting said member to the plunger of the feeder, and means for adjusting said cam and member relatively to select the cam section desired during the continued operation of the feeder.

27. In a glass feeder of the type wherein a reciprocating plunger operates over a submerged orifice in a container for molten glass thereby discharging a succession of measured mold charges shaped in suspension, mechanism for varying the amount of glass fed by expulsion in each charge during the continued feeding of a succession of charges, said mechanism comprising, an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam to engage different sections thereof with the cam roller to vary said expulsive effects.

28. In a glass feeder of the type wherein a reciprocating plunger operates over a submerged orifice in a container for molten glass thereby discharging a succession of measured mold charges shaped in suspension, mechanism for varying the plunger stroke and plunger height independently, said mechanism comprising, an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam and cam roller relatively to select the desired cam section, and mechanism for adjusting the plunger and plunger operating mechanism including the cam and cam roller vertically as a unit in relation to the discharge orifice.

29. In a glass feeder of the type wherein a reciprocating plunger operates over a submerged orifice in a container for molten glass thereby discharging a succession of measured mold charges shaped in suspension, mechanism for varying the ratio of the amount of glass fed by expulsion to the amount of glass fed by gravity in each charge, said mechanism comprising, an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam and cam roller relatively to vary said expulsive effects, said means readily accessible to the operator of the machine and means for varying independently the quantity of glass fed by gravity, said means comprising, mechanism for adjusting the plunger and plunger operating mechanism including the cam and cam roller vertically as a unit in relation to the discharge orifice.

30. In a glass feeder of the type wherein a reciprocating plunger operates over a submerged orifice in a container for molten glass thereby discharging a succession of measured mold charges shaped in suspension, mechanism for varying the amount of glass fed by expulsion in each charge during the continued feeding of a succession of charges, said mechanism comprising, an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam to engage different sections thereof with the cam roller to vary said expulsive effects, said means operable during the continued feeding of charges of glass.

31. In a glass feeder of the type wherein a reciprocating plunger operates over a submerged orifice in a container for molten glass thereby discharging a succession of measured mold charges shaped in suspension, mechanism for varying the plunger stroke and plunger height independently, said mechanism comprising an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam and cam roller relatively to vary said expulsive effects, and mechanism for adjusting the plunger and plunger operating mechanism including the cam and cam roller vertically as a unit in relation to the discharge orifice, said mechanisms operable during the continued feeding of charges of glass.

32. In a glass feeder of the type wherein a reciprocating plunger operates over a submerged orifice in a container for molten glass thereby discharging a succession of measured mold charges shaped in suspension, mechanism for varying the ratio of the amount of glass fed by expulsion to the amount of glass fed by gravity in each charge during the continued operation of the machine, said mechanism comprising an elongated cam for reciprocating the plunger, the curvature of said cam varying longitudinally so that utilization of different cam sections produces different expulsive effects upon the charges being fed, a cam roller operatively connected with the plunger so that the rotation of the cam reciprocates the plunger, means for adjusting said cam and cam roller relatively to vary said expulsive effects, and means for varying independently the quantity of glass fed by gravity, said means comprising, mechanism for adjusting the plunger and plunger operating mechanism including the cam and cam roller vertically as a unit in relation to the discharge orifice, both of said means operable during the continued feeding of charges of glass.

33. In a glass feeder of the type wherein a reciprocating plunger operates over a submerged orifice in a container for molten glass thereby discharging a succession of measured mold charges shaped in suspension, mechanism for centering the plunger in relation to the orifice, said mechanism comprising a platform at one side of the container, means for adjusting said platform in directions at right angles to each other in a horizontal plane, and mechanism mounted upon said platform for supporting and reciprocating said plunger.

34. In a glass feeder of the type wherein a reciprocating plunger operates over a submerged orifice in a container for molten glass thereby discharging a succession of measuring mold charges shaped in suspension, mechanism for varying the characteristics of the stroke of the plunger, said mechanism comprising a cam for reciprocating the plunger, said cam provided with contouring which varies longitudinally so that relative longitudinal adjustment of the cam and mechanism operated thereby changes the characteristics of the plunger stroke, mechanism operated by said cam, said mechanism operatively connecting said cam and plunger so that the plunger is reciprocated by the rotation of the cam, and an adjustment displacing said cam and said mechanism operated thereby relatively, longitudinally, so that the operator of the machine may select the desired cam contouring and thereby determine the characteristics of the plunger stroke.

In witness whereof, I hereunto subscribe my name.

EDMA H. CURTIS, Jr.